Jan. 6, 1942.　　　R. R. CURTIS　　　2,268,804
AIRCRAFT FUEL PUMP
Filed July 13, 1939

INVENTOR.
Russell R. Curtis
BY Frederick W. Cotterman
ATTORNEY.

Patented Jan. 6, 1942

2,268,804

UNITED STATES PATENT OFFICE 2,268,804

AIRCRAFT FUEL PUMP

Russell R. Curtis, Dayton, Ohio, assignor to Curtis Pump Company, Dayton, Ohio, a corporation of Ohio Application July 13, 1939, Serial No. 284,263

10 Claims. (Cl. 308—36.2)

This invention relates to fuel pumps for aircraft engines, particularly to mechanism for maintaining at a constant value the preselected pressure on the discharge side of the pump, and to mechanism for solving in an improved manner, the driving, sealing, lubricating, and other problems peculiar to pumps of this class.

In any power pump having moving pumping elements, it is necessary to bring out a shaft or equivalent means for connection to the power source, such shafts being usually referred to as the pump drive. In a pump drive of the character herein shown it is essential that there be universal joint means, or the equivalent, for connecting the pump and engine to accommodate slight misalignments therebetween, as well as effective sealing means to prevent interchange of fuel from the pump and lubricating oil from the engine, and it is therefore an object of the invention to so construct and arrange the pump drive as to achieve these several essentials in a new way and in less space and more effectively than in any structure heretofore known.

Other objects, advantages, and meritorious features will become apparent as the invention is described in greater detail with reference to the drawing, wherein.

Like numerals refer to like parts throughout the several views.

Figures 1, 2, 3, 4:
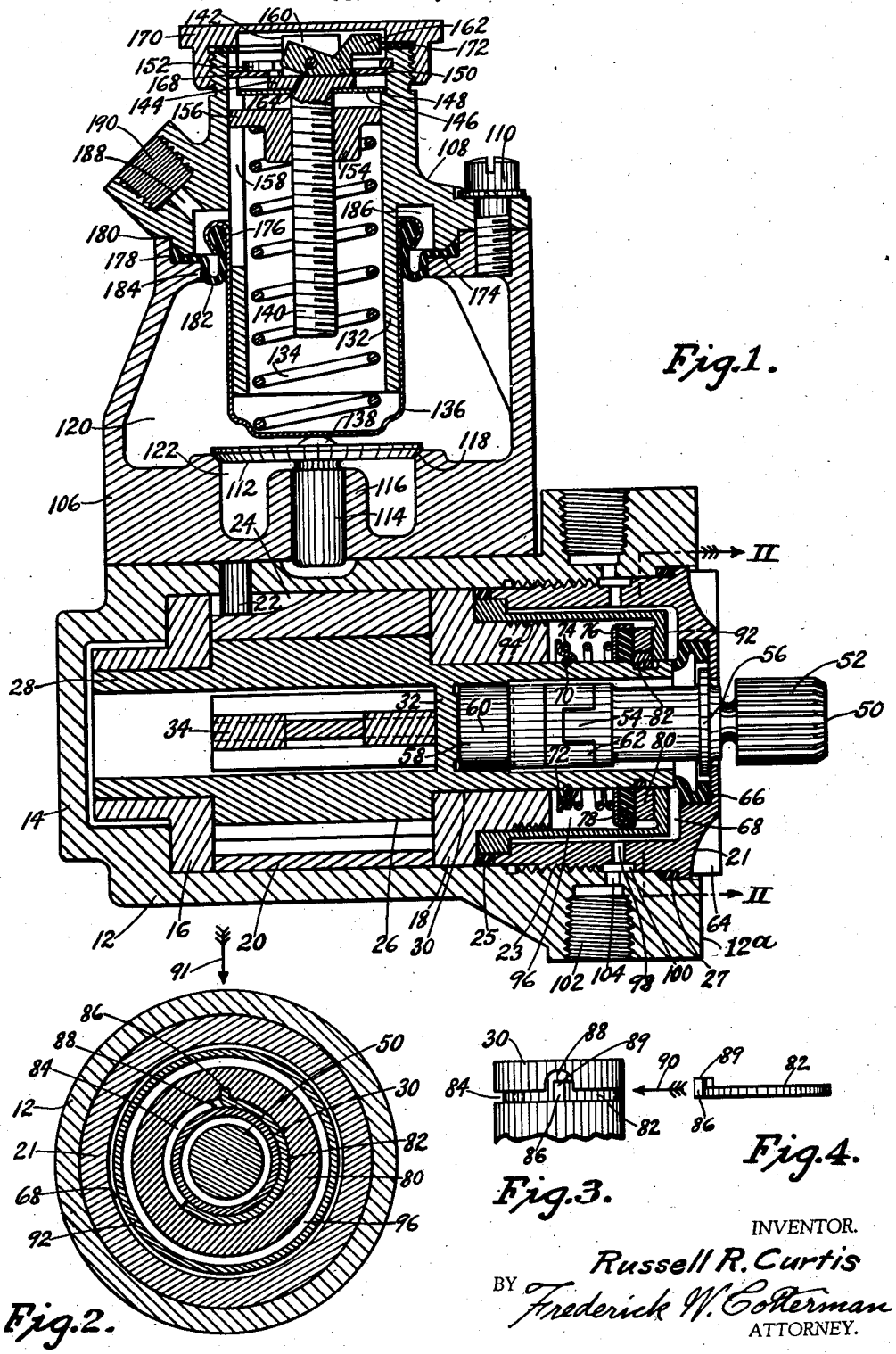
Fig. 1 is a vertical axial section through a pump showing details of construction of the pump drive with its universal joint and seals.
Fig. 2 is an axially transverse section taken through Fig. 1 at II—II to show the fuel seal ring and its special driving key.
Fig. 3 is a fragmentary view of the end of the pump shaft with the special driving key in place.
Fig. 4 is a side view of the driving key.

The pump body 12 is closed by a rear end wall 14 (see Fig. 1) and bored intermediate the ends to concentrically support the rear bearing 16, the front bearing 18, and the eccentrically bored pump cylinder 20. The bearings and cylinder are preferably press fitted one against the other in the body, the cylinder being additionally positioned and held against rotation by the pin 22 which extends through the body into a keyway 24, preferably cut in the thicker portion of the cylinder wall. A cup shaped seal nut 21 having external threads 23 fitted to appropriate internal threads in the body 12 closes the open end of the body, and, together with resilient seal rings 25 and 27 holds the bearings and cylinder in place and provides against leakage between the seal nut and body.

The rotor 26 has a rear journal 28 and a front journal 30 rotatable in bearings 16 and 18 respectively. The rotor is hollowed for lightness and other reasons, a blind hole extending into the rear journal and through the rotor body and another into the front journal, a partition wall 32 separating the inner ends of the two holes.

The rotor 26 is transversely slotted to slidably receive three intersecting through-blades 34, the cylinder bore and ends of the blades being so formed that the blade ends contact the cylinder wall at all points in their rotation.

The pump drive comprises a drive shaft 50 externally splined on its outer end as at 52 to slidably enter corresponding internal splines in the end of an engine shaft or other power take off. The inner end has a driving tongue 54. A collar 56 intermediate the ends holds the shaft from any appreciable axially outward movement.

At the bottom of the hole in the front journal 30 adjacent the partition 32 is a driving member 58 which is secured in driving relation to the journal 30 by a plurality of relatively fine serrations 60 cut exteriorly on the member and heat treated to a high degree of hardness. Near the bottom, the interior surface of the hole in the journal may be left soft so that when the member 58 is pressed into the hole it will cut its own splines for joining the member and shaft in driving relation.

The outer end of the member 58 is transversely slotted to slidably receive a corresponding tongue in the Oldham coupling member 62, the outer end of the coupling member being transversely slotted at 90 degrees from its tongue to fit slidably over the tongue 54 on the inner end of the drive shaft 50. The hole in journal 30 is enough larger than the outer diameter of the coupling 62 and shaft 50 to allow for considerable universal action of the shaft.

A pilot 64 on the seal nut 21 is adapted to enter a corresponding recess in the end of the engine bearing to effect substantial concentricity between the engine and pump axes, the flange 12a being bolted to the engine by screws (not shown), whereby lubricating oil from the engine bearing may readily find its way to the Oldham coupling member 62 and its cooperating parts.

A sealing ring 66, preferably of molded synthetic rubber or similar material is pressed into a counterbored opening in the inner face of the seal nut 21. The ring 66 is of somewhat greater overall dimensions axially as it comes from the mold than it is when in place as shown, whereby the face of the ring after assembly exerts a considerable axial pressure against the end face of the journal 30, thereby effectively preventing any substantial amount of oil from the engine bearing or from the interior of the journal from escaping into the drain space 68 or other parts of the pump.

In order to prevent such leakage of fuel as may escape between the front bearing 18 and front journal 30 from passing through and into the drain space 68, a highly effective seal must be provided. A spring ring 70 is snapped into a groove in the outside of the journal 30 to hold a spring retaining washer 72, against which one end of the seal spring 74 bears.

The other end of the seal spring bears against a cup 76 which contains the packing ring 78. Ring 78 may preferably be made of synthetic rubber, the hole being of such size as to fit the outside of the journal 30 tightly so as to prevent leakage between the outside of the journal and the inside of the ring.

A seal ring 80 is compelled to rotate in unison with the journal 30 by a key 82. Due to the fact that the wall of the journal is relatively thin, and the fact that the key must be removable to allow the spring retaining washer 72, cup 76 and packing ring 78 to be assembled and removed, the key is of special construction.

Key 82 fits slidably in an annular groove 84 in the outside of journal 30 (see Fig. 2) and comprises a rectangular strip bent to somewhat over a half circle and with enough resiliency to snap over the shaft diameter in the bottom of the groove. The upper end of the strip is bent radially outward to compose the key part 86 which enters a keyway in the seal ring 80 to drive it.

In order to provide rotary driving connection of the key 82 with the journal 30, the annular groove 84 is provided with a semicircular inflection 88, in one edge and the upturned end 86 is widened as at 89 at this point to extend into this inflection. Fig. 3 shows the outer end of the journal with the key in place as viewed in the direction of the arrow 91, Fig. 2, while Fig. 4 shows the key viewed in the direction of the arrow 90 but removed from the journal.

Owing to the fact that externally to internally threaded together members are not conducive to extreme concentricity one with the other, and the further fact that slight distortion might occur in pressing the seal seat into place, the seal seat is not carried in the seal nut 21, but on the end of a separate cup shaped seal housing 92 especially provided for the purpose.

The outside of the front bearing 18 should be finished truly concentric with the bore and the seal housing 92 fitted closely thereover. The end face of the housing and the shoulder on the bearing 18 which are in contact must both be faced to a true plane at right angles to the pump axis.

The external threads 94 which appear on the bearing 18 are provided for pulling the bearing out when disassembling the pump, there being no corresponding internal threads in the seal housing 92 which is clamped in place only by the seal nut 21. The resilient seal rings 25 and 27 are made enough wider than the space they ultimately occupy that when the nut 21 is drawn solidly against the seal housing, the rings will be under proper compression to make a tight joint.

The surfaces of the seal ring 80 and seal housing 92 which are in relatively rotatable contact are preferably finished to mirror-like smoothness and are kept in rubbing contact by the spring 74 which presses the cup 76 against the packing ring 78 which in turn presses against the seal ring 80, the parts 70, 72, 74, 76, 78, and 80 all having unitary rotation with the journal 30.

It will be seen that any fuel escaping between the bearing 18 and journal 30 is caught in the seal chamber 96. The amount of leakage fuel escaping from chamber 96 is extremely small because of the tight fit of the packing ring 78 over the journal 30 and the spring pressure contact of the packing ring with the seal ring 80 all of which surfaces have unitary rotation, as well as the spring pressure contact of the highly finished metallic contacting surfaces between the rotatable seal ring 80 and the stationary seat in the end of the seal housing 92.

Since some slight leakage may at times occur from the seal chamber into the drain space 68, the small hole 98 connects the space 68 with an annular groove 100 encircling the seal nut 21 which in turn is connected with the pipe tapped holes 102 by the small holes 104. Opposite drain holes are provided so that the pump may be mounted the other side up when desired.

One advantage of the combination seal and drive will be obvious. The rotatable seal ring 80, being carried on the journal 30, and not on the drive shaft 50 as in general practice, is not subject to eccentric rotation tending to unseat it when the drive shaft makes use of its universal joint to rotate eccentrically under slight misalignment.

The arrangement possesses the further advantage that any fuel which gets past the rotatable seal ring 80 must do so by moving radially inward against the action of the centrifugal force of its own weight, whereas the escape past a seal which is placed directly at the end of the bearing, as is usually done, is aided by the action of centrifugal force.

The flexible sealing ring 66 permits direct communication between the oil supply of the engine bearing and the universal joint, whereby the joint is adequately lubricated, but prevents any considerable engine oil escaping into the drain space 68 or back into the pump, such fuel as escapes into the drain space being prevented from mixing with the engine oil.

The relief valve structure, provided for maintaining the discharge pressure at a constant value, is housed in a valve body 106 which is secured to the pump body 12 by screws (not shown), and a valve head 108 secured to the main valve body 106 by the screws 110.

The relief valve proper is of the poppet type comprising the disc 112 with stem 114 slidable in a hub 116 of the main body 106, the disc being beveled at 118 and having a corresponding angular seat in the body which divides the interior of the body 106 into a suction chamber 120 including all of the space above the disc 112 and a discharge chamber 122 being the space below the disc.

Suitable ducts (not shown) in the pump and valve bodies respectively, connect a suction port to the suction chamber 120, while other ducts in the valve body and pump body respectively, connect the discharge chamber 122 to a discharge port.

Depending from the valve head 108 into the suction chamber 120 is a long hub 132 internally chambered to contain the valve loading spring 134 and externally sized to slidably receive the valve spring cup 136 the bottom of which rests upon a small knob 138 on the upper side of the valve disc 112.

The valve spring adjusting means comprises an adjusting screw 140 with a head 142 and a flange 144 intermediate the screw and head, the flange being of larger diameter than the head. The lower adjusting screw retaining washer 146 rests on a shoulder 148 and has a central opening through which the screw extends freely, the flange 144 resting on the upper face of the washer. The upper retaining washer 150 has a central opening which passes over the screw head 142 loosely and rests on the flange 144. A spring ring 152 is snapped into a groove at the upper edge of the washer 150, the groove being positioned to hold the two washers so spaced as to allow free turning movement of the flange 144 between them.

The spring adjusting nut 154 is tapped to fit the external threads of the screw 140 and has a key 156 extending laterally into the keyway 158 of the valve head 108, whereby the nut is held nonrotatable when the screw is turned, yet may move freely in an axial direction.

The head 142 of the adjusting screw is provided with a deep screw driver slot 160 in which the locking bar 162 is fitted snugly and is hinged therein by the pin 164. The hole in the upper retaining washer 150 has a series of radial notches (not shown) into any one of which the lower edge of the locking bar 162 may be entered. The washer 150 also has a key 168 at its outer edge which extends into the key way 158 to hold the washer 150 from rotating.

The adjusting screw cap 170 when drawn tightly to the gasket 172, allows but a slight clearance between the inside of the cap and the top of the locking bar 162, whereby the bar is retained in the notch in which it has been placed as long as the cap is in position.

When an adjustment of the spring 134 is to be made, the cap 170 is first removed, then, the simple insertion of a screw driver into the screw slot 160, the locking bar 162 is made to rise out of the radial notch of the washer 150 into which it is entered and the screw may be rotated until the desired adjustment is attained, whereupon the locking bar is pushed into the nearest radial notch and the cap 170 replaced. In a situation where it may be necessary to reach into close spaces to make this adjustment, the desirability of this simple manipulation is obvious. Furthermore, where height is limited, as it is on pumps of this class, a small portion only of the available height is taken by the adjusting and locking means, leaving space for a longer and more flexible spring, whereby larger increments of adjustment may be made with smaller resulting variations in spring stress, making the matter of adjusting for fine variations in discharge pressure not dependent upon skillful or careful manipulation of the adjusting means. The use of a longer and more flexible spring also results in less variation in the discharge pressure at the various speeds of rotation and rates of discharge encountered in the operation of air craft.

Now, as is well known in the art, the suction head against which the pump operates varies from one instant to the next because of aircraft acceleration, or deceleration, or altitude, or the fact that the fuel tank, when the craft climbs, may be well below the pump, and when it dives, it may be well above it, or vice versa, all depending upon the respective locations of the pump and tank, so that, if an ordinary spring loaded relief valve only were provided, the constant rise and fall of the pressure in chamber 120 would constantly influence the discharge pressure, because the sum total of effort acting against the spring to open the valve would be the discharge pressure, acting to raise the valve from below, added to the suction tending also to raise it but from above. Valves for use in this situation are therefore provided with a balancing means whereby variation in the suction does not add to nor subtract from the forces tending to open the valve, and therefore does not affect the discharge pressure.

The relief valve balancing means herein provided comprises a diaphragm 174 of resilient synthetic rubber preferably with an internal fabric layer (not shown) to give it additional strength. Around the edge of the central opening the material is thickened to provide a ring 176 around which the upper edge of the spring cup 136 is so closely rolled as to form an air tight joint at this point, and prevent the cup and diaphragm from pulling apart in operation.

The diaphragm is also made thicker at the outer edge to form the wedging ring 178, this ring and a small portion of the diaphragm being clamped between the valve body 106 and head 108.

Since the material of the diaphragm is subject to cold flow under excessive pressure, the space between the body 106 and head 108 which contains the outer edge must be carefully made so that when metal to metal contact of the body and head is made at 180, the diaphragm will be gripped tight enough to safely prevent pulling out under the suction pressure in operation, but not tight enough to cause cold flow.

The active portion 182 of the diaphragm is of U shaped cross section which loops downward between the outside of the cup 136 and the inner edge of the annular rib 184 in the body 106.

Since the material composing the diaphragm swells appreciably from gasoline absorption, the loop 182 will drop downward more as the material swells. It will also be drawn upwardly farther as the valve rises to its maximum height. If then, the effective area of the diaphragm is to remain constant under both of these extremes, the sides of the U loop must be so supported as to maintain a constant width under all conditions.

This condition will be met when the drop in the loop 182 and the width of the rib 184 is such that the sides of the loop will be held parallel and to a uniform spacing with each other in all positions. In such a structure the effective area of the diaphragm will be constant for any valve lift and for any degree of swelling of the material, and the discharge pressure will be unaffected by these variations.

The space above the diaphragm, in the form of a chamber 186, is usually connected by a hole 188 to the atmosphere, but may be connected to the intake manifold when a supercharger is employed, by a pipe fitted to the pipe tapped opening 190, causing the fuel discharge pressure to increase directly with rise in manifold pressure.

Obviously, increased suction in the chamber 120 will pull as much harder downwardly on the cup 136 as it does upwardly on the valve disc 112, and the valve closing pressure will be controlled entirely by the spring 134 independently of variations in suction head.

As is customary in power pumps of aircraft fuel systems, a by-pass valve is incorporated in the relief valve body (not shown), so that, in the event of sticking of the power pump rotor, or other power pump failure, fuel may be forced through the power pump, independently of its pumping elements, by means of an auxiliary hand pump provided for the purpose.

Having described an embodiment of the invention in which the objects hereinbefore set forth are attained, I claim:

1. In a pump, a rotatable element, a bearing for said rotatable element, a hollow journal for said element extending through and beyond said bearing, a seal on the extended portion of said hollow journal for controlling leakage between said bearing and journal, means containing a leakage space around the outer end of said journal, and a second seal at the end of said journal for controlling leakage between said hollow and said leakage space.

2. In a pump, a rotatable element, a bearing for said rotatable element, a hollow journal for said element extending through and beyond said bearing, a hollow seal housing extending beyond said bearing to near the end of said journal, seal supporting means in the pump beyond said seal housing positioned to leave a leakage space at the end of the seal housing, a seal within said seal housing for controlling the leakage between said bearing and journal into said leakage space, and a second seal in said seal supporting means for controlling leakage from the hollow of said journal into said leakage space.

3. In a pump, a rotatable element, a bearing for said rotatable element, a cup shaped seal housing having its open end supproted concentrically with said bearing with its bottom beyond the end of the bearing, thereby forming a seal chamber within said housing between the end of said bearing and said bottom, a second cup shaped housing supported in the pump and surrounding the first, leaving a leakage space between the bottoms of the cups, a hollow journal extending through said bearing, through said seal chamber, and through the bottom of said seal housing, a seal within said seal chamber for controlling leakage from said chamber between the periphery of said journal and the bottom of the seal housing into said leakage space, and a second seal between said hollow journal and said second housing for controlling leakage between the hollow of said journal and said leakage space.

4. A drive and seal for a fluid pump comprising, a pump body, a rotatable pumping element in said body, a bearing for said element, a hollow journal for said element extending through and considerably beyond said bearing, a hollow seal housing extending from the outside of said bearing axially to near the end of said journal with an end wall extending inwardly to said journal, a seal holding member extending from the pump body inwardly to the drive shaft leaving a leakage space between the seal housing and said member, a seal carried by said seal holding member contacting the end of said journal for sealing against leakage between the hollow of said shaft and said leakage space, and a second seal within the seal housing for controlling leakage between said leakage space and the inside of said seal housing.

5. A drive and seal for a fluid pump having a pump body, comprising a rotatable pumping element in said body, a bearing for said element, a hollow journal for said element extending through and considerably beyond said bearing, a hollow seal housing concentrically supported on the outside of said bearing and extending axially to near the end of said journal and having an end wall through which the journal extends, thereby forming a seal space around said journal between said bearing and said end wall, a cup shaped seal nut screwed into said body and telescoping said housing and adapted to hold said housing in intimate contact with said bearing, said seal nut having an end wall extending inwardly to said shaft, leaving a leakage space between the bottoms of said nut and said housing into which the end of the journal extends, a seal carried on said journal within said seal space for unitary rotation with said journal, and resiliently held in contact with the end wall of the seal housing, and a second seal carried in the end wall of the seal nut resiliently pressed against the end of the journal.

6. The combination with a pump having a rotatable pumping element, a bearing for said element, and a journal for said element extending through and considerably beyond the outer end of said bearing, of a seal for controlling leakage between said bearing and journal, said seal comprising, a shoulder on said bearing, a seal housing on the outside of said bearing with its open end against said shoulder and an end wall closing into said journal at its outer end thereby leaving a seal space within the housing around the extending end of said journal and between the end of the bearing and the end wall of the housing, a seal nut in the housing for pressing the open end of the housing into intimate contact with the shoulder on said bearing, a seal ring within said seal space on said journal adjacent said end wall, a key in said journal for driving said seal ring but permitting axial movement of the ring on the journal, a resilient packing washer having one side in contact with the seal ring and a pressure tight fit on the journal, a packing cup containing said packing washer, the open side of the cup being toward the seal ring, a retaining washer fixed against axial movement on the journal, and a spring under stress between said retaining washer and said packing cup.

7. The structure defined in claim 6 wherein the journal is hollow and has an annular groove with a lateral pocket in one side, and said key comprises a strip of the cross section of the groove extending circumferentially in the groove for slightly over a half circle and with one end bent radially outward to form the driving part, the end forming the driving part being widened to extend into the lateral pocket.

8. A seal for relatively moving parts, comprising, in combination with a rotatable element having an annular shoulder, a bearing for said element having an annular end flange abutting against said shoulder and a journal for said element extending through said bearing, a cup-shaped seal housing having its open end enclosing said bearing and abutting against the flange thereof and having its other end inturned toward said journal to provide a sealing space axially of said journal between said bearing and said inturned end, a sealing ring in said space adjacent said inturned end, a resilient packing washer also within said space movable axially of said journal against said sealing ring, resilient means urging said packing washer against said sealing ring, and a cup-shaped seal nut enclosing and holding said seal housing in tight abutment against said bearing and also holding said bearing flange against said shoulder.

9. A seal for relatively moving parts, comprising, in combination with a rotatable element having an annular shoulder, a bearing for said element having an annular end flange abutting against said shoulder and a journal for said element extending through said bearing, a cup-shaped seal housing having its open end enclosing said bearing and abutting against the flange thereof and having its other end inturned toward said journal to provide a sealing space axially of said journal between said bearing and said inturned end, a sealing ring in said space adjacent said inturned end, a key locking said sealing ring to said rotatable element against relative rotation, a resilient packing washer also within said space movable axially of said journal against said sealing ring, resilient means urging said packing washer against said sealing ring, and a cup-shaped seal nut enclosing and holding said seal housing in tight abutment against said bearing and also holding said bearing flange against said shoulder.

10. The combination with a grooved rotatable shaft of a sealing ring and an annular key for securing said ring to said shaft against relative rotation, said key having a cross-section throughout substantially its length the same as the cross-section of the groove and being positioned within said groove to lie wholly beneath said ring, said key having a lug at one end extending both laterally and radially, and said groove and ring having cooperating recesses for receiving said lug to anchor said ring to said shaft.

RUSSELL R. CURTIS.